United States Patent
Wang et al.

(10) Patent No.: US 11,535,799 B2
(45) Date of Patent: *Dec. 27, 2022

(54) LIQUID CRYSTAL COMPOSITION, LIQUID CRYSTAL DISPLAY ELEMENT AND LIQUID CRYSTAL DISPLAY

(71) Applicant: Shijiazhuang Chengzhi Yonghua Display Material Co., Ltd., Hebei (CN)

(72) Inventors: Kui Wang, Hebei (CN); Sumin Kang, Hebei (CN); Zhian Liang, Hebei (CN); Guoliang Yun, Hebei (CN); Hongfeng Li, Hebei (CN); Jiaming Li, Hebei (CN); Ruixiang Liang, Hebei (CN)

(73) Assignee: SHIJIAZHUANG CHENGZHI YONGHUA DISPLAY MATERIAL CO., LTD., Hebei (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/272,127

(22) PCT Filed: Nov. 18, 2020

(86) PCT No.: PCT/CN2020/129885
§ 371 (c)(1),
(2) Date: Feb. 26, 2021

(87) PCT Pub. No.: WO2021/135704
PCT Pub. Date: Jul. 8, 2021

(65) Prior Publication Data
US 2022/0049162 A1   Feb. 17, 2022

(30) Foreign Application Priority Data
Dec. 30, 2019 (CN) .......................... 201911394921.X

(51) Int. Cl.
*C09K 19/34* (2006.01)

(52) U.S. Cl.
CPC ...... *C09K 19/3405* (2013.01); *C09K 19/3491* (2013.01); *C09K 2019/3408* (2013.01)

(58) Field of Classification Search
CPC ...................................... C09K 19/34
See application file for complete search history.

(56) References Cited

U.S. PATENT DOCUMENTS

2019/0375986 A1* 12/2019 Xing ................ C09K 19/12

FOREIGN PATENT DOCUMENTS

| CN | 107267156 A | | 10/2017 | |
|---|---|---|---|---|
| CN | 109423303 A | * | 3/2019 | ............ C09K 19/44 |
| CN | 109880639 A | * | 6/2019 | ........... C09K 19/062 |
| CN | 109913238 A | | 6/2019 | |
| CN | 110577832 A | | 12/2019 | |
| WO | WO-2019116901 A1 | * | 6/2019 | ............. C09K 19/04 |
| WO | WO-2019116902 A1 | * | 6/2019 | ............. C09K 19/04 |

* cited by examiner

*Primary Examiner* — Chanceity N Robinson
(74) *Attorney, Agent, or Firm* — Muncy, Geissler, Olds & Lowe, P.C.

(57) ABSTRACT

A liquid crystal composition, a liquid crystal display element and a liquid crystal display including the liquid crystal composition, belonging to the field of liquid crystal display. The liquid crystal composition includes a compound represented by formula I and one or more compounds represented by formula II. The liquid crystal composition can increase the dielectric anisotropy and improve the voltage retention rate.

6 Claims, No Drawings

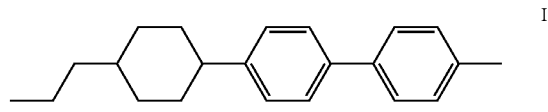

I

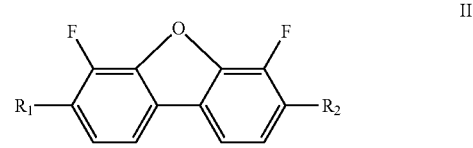

II

LIQUID CRYSTAL COMPOSITION, LIQUID CRYSTAL DISPLAY ELEMENT AND LIQUID CRYSTAL DISPLAY

TECHNICAL FIELD

The present disclosure belongs to the field of liquid crystal display, in particular to a liquid crystal composition and a liquid crystal display element or liquid crystal display containing the liquid crystal composition.

BACKGROUND ART

Display is the process of transforming electrical signal (data information) into visible light (visual information). The device to complete the display is man-machine interface (MMI), flat panel display (FPD) is the most popular display device now. Liquid crystal display (LCD) is the first product developed and commercialized in FPD. At present, thin film transistor liquid crystal (TFT-LCD) has become the mainstream product in LCD application.

The development of TFT-LCD has gone through a long period of basic research. After the realization of mass production and commercialization, TFT-LCD products are rapidly recognized by the market for their advantages of light weight, environmental protection and high performance, and gradually develop to large-scale and multi-type applications. The application of TFT-LCD can be seen everywhere, whether it is a small-sized mobile phone screen, a large-scale Notebook PC or monitor, and a large-scale LCD TV (LCDTV). TFT-LCD can be divided into three types, twisted nematic/super twisted nematic (TN/STN), planar conversion (IPS) and vertical alignment (VA). The early commercial TFT-LCD products basically adopt twisted nematic (TN) display mode, the biggest problem is that the viewing angle is not large enough. With the increase of the size of TFT-LCD products, especially the application of TFT-LCD in the field of TV, the in-plane switching (IPS) display mode with wide field of view has been developed and applied. IPS display mode is first published in 1974 by american R. Soref in the form of a paper, and is proposed by german G. Baur to apply it as a wide perspective technology in TFT-LCD. In 1995, Hitachi of Japan developed the world's first 13.3-inch IPS wide field angle TFT-LCD product.

Compared with other kinds of liquid crystal displays, VA type liquid crystal display has a very high contrast, because in the dark state without power on, the liquid crystal molecules are arranged perpendicular to the surface of the substrate, without any phase difference, extremely low light leakage, low dark brightness and high contrast, which makes it widely used in large-scale display, such as television and so on. However, in the existing technology, the LCD response speed is not fast enough, the threshold voltage is not low enough, the voltage retention rate is not high enough, the ion density is not low, and the display yield rate is low, which has become the main obstacle for the LCD to achieve higher performance specifications. Improving the above indicators is also the goal that all device manufacturers have been pursuing.

SUMMARY OF THE INVENTION

In order to solve the problems existing in the prior art, the inventors and others found that the problems of insufficient dielectric anisotropy and low voltage retention rate of liquid crystal materials can be solved through the technical scheme of the disclosure.

Another object of the present disclosure is to provide a liquid crystal display element comprising a liquid crystal composition of the present disclosure, which has a fast response speed.

A further object of the present disclosure is to provide a liquid crystal display comprising a liquid crystal composition of the present disclosure, which has a fast response speed.

To achieve the above purpose, the present disclosure adopts the following technical solutions:

A liquid crystal composition comprising a compound represented by formula I and one or more compounds represented by formula II is provided,

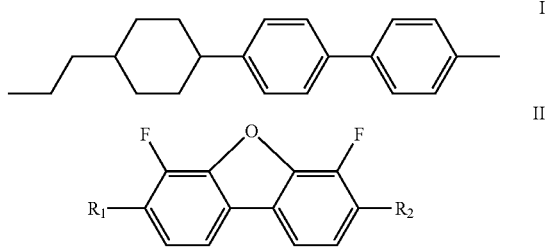

in formula II, $R_1$ represents alkyl group having a carbon atom number of 1-10, fluoro-substituted alkyl group having a carbon atom number of 1-10, alkoxy group having a carbon atom number of 1-10, fluoro-substituted alkoxy group having a carbon atom number of 1-10; any one —$CH_2$— or several —$CH_2$— that are not adjacent of the group indicated by $R_1$ are selectively substituted by cyclopentyl, cyclobutyl or cyclopropyl;

$R_2$ represents alkyl group having a carbon atom number of 1-10, fluoro-substituted alkyl group having a carbon atom number of 1-10, alkoxy group having a carbon atom number of 1-10, fluoro-substituted alkoxy group having a carbon atom number of 1-10.

The invention also provides a liquid crystal display element, which comprises a liquid crystal composition of the present disclosure. The liquid crystal display element is an active matrix addressing display element or a passive matrix addressing display element.

The present disclosure also provides a liquid crystal display comprising a liquid crystal composition of the present disclosure. The liquid crystal display is an active matrix addressing display or a passive matrix addressing display.

Effect of Invention

The beneficial effect of the present disclosure is that the liquid crystal composition has large dielectric anisotropy of liquid crystal material and high voltage retention rate. The liquid crystal display element and the liquid crystal display containing the liquid crystal composition have fast response speed, thereby realizing the effect of improving the performance of the liquid crystal display.

DETAILED DESCRIPTION OF EMBODIMENTS

[Liquid Crystal Composition]

The liquid crystal composition of the present disclosure comprises a compound represented by formula I and one or more compounds represented by formula II,

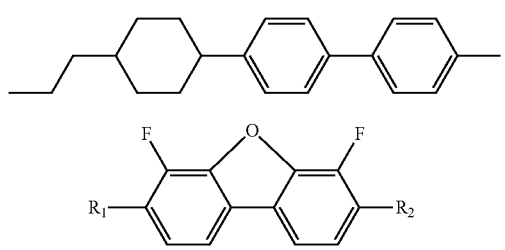

in formula II, $R_1$ represents alkyl group having a carbon atom number of 1-10, fluoro-substituted alkyl group having a carbon atom number of 1-10, alkoxy group having a carbon atom number of 1-10, fluoro-substituted alkoxy group having a carbon atom number of 1-10; any one —$CH_2$— or several —$CH_2$— that are not adjacent of the group indicated by $R_1$ are selectively substituted by cyclopentyl, cyclobutyl or cyclopropyl;

For example, 1,2-cyclopentanyl, 1,3-cyclopentanyl, 1,2-cyclobutylene, 1,3-cyclobutylene can be listed as the cyclopentanyl, cyclobutylene mentioned above;

$R_2$ represents alkyl group having a carbon atom number of 1-10, fluoro-substituted alkyl group having a carbon atom number of 1-10, alkoxy group having a carbon atom number of 1-10, fluoro-substituted alkoxy group having a carbon atom number of 1-10.

The liquid crystal composition can increase the dielectric anisotropy and improve the voltage retention rate. The liquid crystal display element and liquid crystal display containing the liquid crystal composition have low driving voltage and fast response speed.

For example, methyl, ethyl, n-propyl, isopropyl, n-butyl, isobutyl, tert butyl, n-amyl, isoamyl, hexyl, heptyl, octyl, nonyl, decyl, etc. can be listed as the alkyl groups with carbon atom number of 1-10.

For example, methoxy, ethoxy, n-propoxy, isopropoxy, n-butoxy, isobutoxy, pentoxy, hexoxy, hepthoxy, octyloxy, nonoxy, decaoxy, etc. can be listed as the alkoxy groups with the carbon atom number of 1-10.

For example, cyclopentyl, cyclobutyl, cyclopropyl, cyclopentylmethyl, cyclobutylmethyl, cyclopropylmethyl, cyclopentylethyl, cyclobutylethyl, cyclopropyl ethyl, cyclopentyl propyl, cyclopropyl propyl can be listed as the alkyl groups with the carbon atom number of 1-10 which any one —$CH_2$— or several —$CH_2$— that are not adjacent of the groups are selectively substituted by cyclopentyl, cyclobutyl or cyclopropyl, but not limited to these groups.

For example, cyclopentyloxy, cyclobutyloxy, cyclopropyloxy, cyclopentyl methoxy, cyclobutylmethoxy, cyclopropyl methoxy, cyclopentyl ethoxy, cyclobutyl ethoxy, cyclopropyl ethoxy, cyclopentyl propoxy, cyclobutyl propoxy, cyclopropyl propoxy can be listed as the alkoxy groups with the carbon atom number of 1-10 which any one —$CH_2$— or several —$CH_2$— that are not adjacent of the groups are selectively substituted by cyclopentyl, cyclobutyl or cyclopropyl, but not limited to these groups.

The "fluoro-substituted" in the fluoro-substituted alkyl group having a carbon atom number of 1-10, fluoro-substituted alkenyl group having a carbon atom number of 2-10 can be single fluorine substitution, or multi fluorine substitution, such as difluoro substitution and trifluoro substitution, or perfluoro substitution. There is no special algebra for fluorine Limitation. For example, fluoromethyl, difluoromethyl, trifluoromethyl, 1-fluoroethyl, 2-fluoroethyl, 1,2-difluoroethyl, 1,1-difluoroethyl, 1,1,2-trifluoroethyl, 1,1,1,2,2-pentafluoroethyl, etc. can be listed as the fluoro-substituted alkyl group having a carbon atom number of 1-10, but not limited to.

In the liquid crystal composition of the present disclosure, the compounds represented by formula II are preferably selected from the group consisting of the compounds represented by the following formulas II-1~II-6:

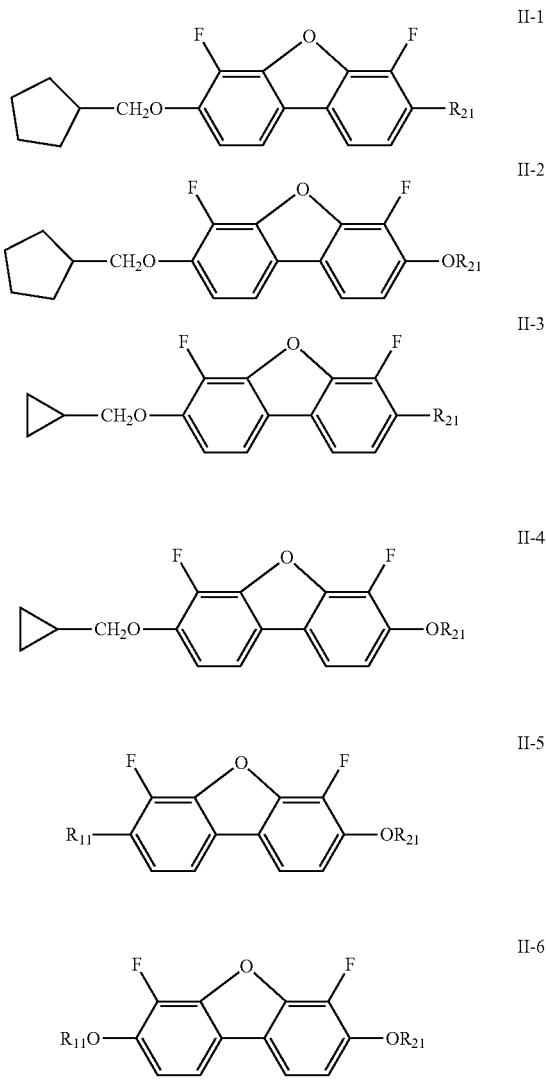

wherein, $R_{11}$ and $R_{21}$ represent alkyl group having a carbon atom number of 1-10.

The liquid crystal composition of the present disclosure preferably also comprises one or more compounds represented by formula III:

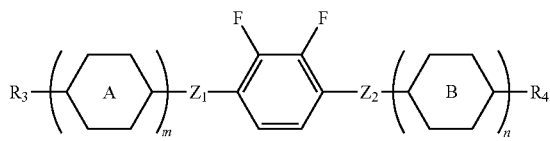

in formula III, $R_3$ and $R_4$ independently represent alkyl group having a carbon atom number of 1-10, fluoro-substituted alkyl group having a carbon atom number of 1-10, alkoxy group having a carbon atom number of 1-10, fluoro-substituted alkoxy group having a carbon atom number of 1-10, alkenyl group having a carbon atom number of 2-10, fluoro-substituted alkenyl group having a carbon atom number of 2-10, alkenoxy group having a carbon atom number of 3-8 or fluoro-substituted alkenoxy group having a carbon atom number of 3-8;

any one —$CH_2$— or several —$CH_2$— that are not adjacent of the groups indicated by $R_3$ and $R_4$ are selectively substituted by cyclopentyl, cyclobutyl or cyclopropyl;

for example, 1,2-cyclopentyl, 1,3-cyclopentanyl, 1,2-cyclobutylene, 1,3-cyclobutylene can be listed as the cyclopentanyl, cyclobutylene mentioned above;

$Z_1$ and $Z_2$ independently represent single bond, —$CH_2CH_2$—, —$OCH_2$— or —$CH_2O$—;

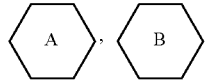

independently represent 1,4-cyclohexylidene, 1,4-cyclohexene, 1,4-phenylene or fluoro 1,4-phenylene;

in represents 0 or 1; n represents 0, 1 or 2.

The compound represented by formula III has negative dielectric anisotropy, and the driving voltage of the liquid crystal composition can be adjusted by containing the compound represented by formula III in the liquid crystal composition of the present disclosure.

In the liquid crystal composition of the present disclosure, the compounds represented by formula III are preferably selected from the group consisting of the compounds represented by the following formulas III-1~III-11:

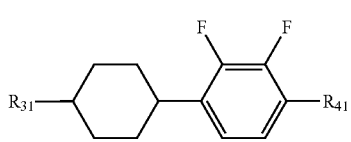

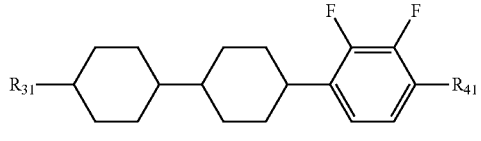

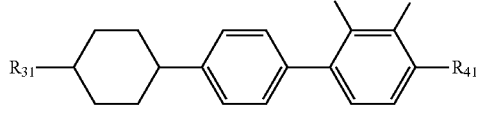

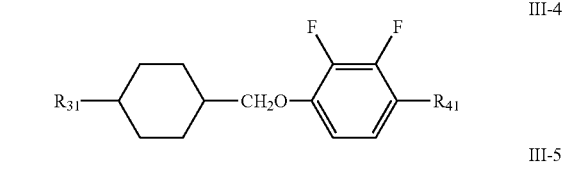

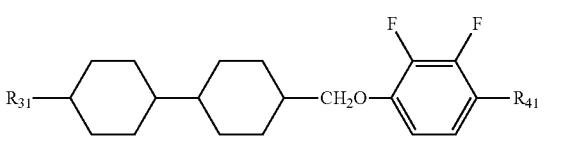

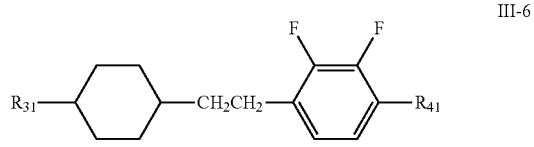

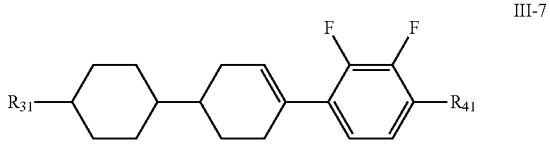

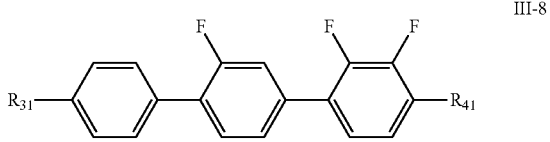

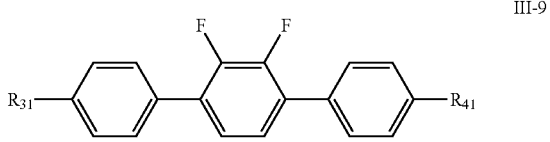

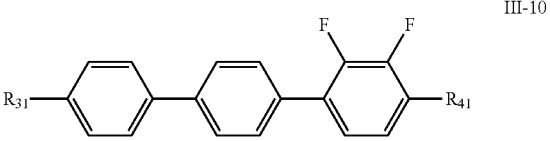

wherein:
$R_{31}$ and $R_{41}$ independently represent alkyl group having a carbon atom number of 1-10, fluoro-substituted alkyl group having a carbon atom number of 1-10, alkoxy group having a carbon atom number of 1-10, fluoro-substituted alkoxy group having a carbon atom number of 1-10, alkenyl group having a carbon atom number of 2-10, fluoro-substituted alkenyl group having a carbon atom number of 2-10, alkenoxy group having a carbon atom number of 3-8 or fluoro-substituted alkenoxy group having a carbon atom number of 3-8;

any one —$CH_2$— or several —$CH_2$— that are not adjacent of the groups indicated by $R_{31}$ and $R_{41}$ are selectively substituted by cyclopentyl, cyclobutyl or cyclopropyl.

for example, 1,2-cyclopentyl, 1,3-cyclopentanyl, 1,2-cyclobutylene, 1,3-cyclobutylene can be listed as the cyclopentanyl, cyclobutylene mentioned above.

The liquid crystal composition of the present disclosure preferably also comprises one or more compounds represented by formula IV:

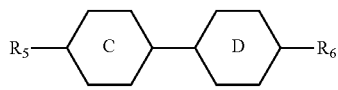
IV wherein, $R_5$ and $R_6$ independently represent alkyl group having a carbon atom number of 1-10, fluoro-substituted alkyl group having a carbon atom number of 1-10, alkoxy group having a carbon atom number of 1-10, fluoro-substituted alkoxy group having a carbon atom number of 1-10, alkenyl group having a carbon atom number of 2-10, fluoro-substituted alkenyl group having a carbon atom number of 2-10;

independently represent 1,4-cyclohexylidene, 1,4-cyclohexene or 1,4-phenylene.

By containing the compound represented by formula IV in the liquid crystal composition of the present disclosure, the mutual solubility of the liquid crystal composition can be reduced, and the rotational viscosity can be reduced, so as to improve the response speed of the liquid crystal composition of the present disclosure.

The liquid crystal composition of the present disclosure, preferably, the compounds represented by formula IV are selected from the group consisting of the following compounds represented by formula IV-1~IV-3:

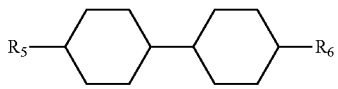
IV-1

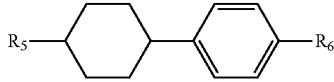
IV-2

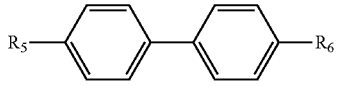
IV-3 wherein, $R_5$ and $R_6$ represent alkyl group having a carbon atom number of 1-10, fluoro-substituted alkyl group having a carbon atom number of 1-10, alkoxy group having a carbon atom number of 1-10, fluoro-substituted alkoxy group having a carbon atom number of 1-10, alkenyl group having a carbon atom number of 2-10, fluoro-substituted alkenyl group having a carbon atom number of 2-10.

The liquid crystal composition of the present disclosure preferably comprises one or more compounds represented by formula V except for those compound represented by formula I:

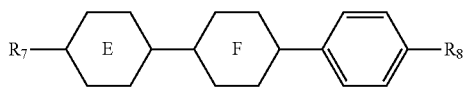
V wherein, $R_7$ and $R_8$ independently represent alkyl group having a carbon atom number of 1-10, fluoro-substituted alkyl group having a carbon atom number of 1-10, alkoxy group having a carbon atom number of 1-10, fluoro-substituted alkoxy group having a carbon atom number of 1-10, alkenyl group having a carbon atom number of 2-10, fluoro-substituted alkenyl group having a carbon atom number of 2-10;

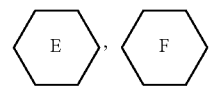

independently represent 1,4-cyclohexylidene, 1,4-cyclohexene or 1,4-phenylene.

By containing the compound represented by formula V in the liquid crystal composition of the present disclosure, the optical anisotropy of the liquid crystal composition can be increased and the brightness point of the liquid crystal composition can be improved, which is conducive to improving the response speed of the liquid crystal composition.

In the liquid crystal composition of the present disclosure, it is preferred that the compounds represented by formula V other than those in formula I are selected from the group consisting of the compounds represented by formulas V-1~V-3 as follows:

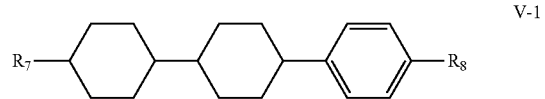
V-1

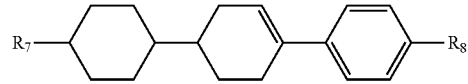
V-2

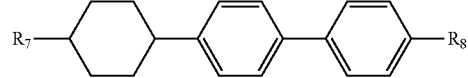
V-3 wherein, $R_7$ and $R_8$ independently represent alkyl group having a carbon atom number of 1-10, fluoro-substituted alkyl group having a carbon atom number of 1-10, alkoxy group having a carbon atom number of 1-10, fluoro-substituted alkoxy group having a carbon atom number of 1-10, alkenyl group having a carbon atom number of 2-10, fluoro-substituted alkenyl group having a carbon atom number of 2-10.

The liquid crystal composition of the present disclosure preferably also comprises one or more compounds represented by formula VI:

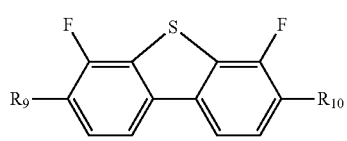
VI wherein, $R_9$ represents alkyl group having a carbon atom number of 1-10, fluoro-substituted alkyl group having a carbon atom number of 1-10, alkoxy group having a carbon atom number of 1-10, fluoro-substituted alkoxy group having a carbon atom number of 1-10, any one —CH$_2$— or several —CH$_2$— that are not adjacent of the group indicated by R$_9$ are selectively substituted by cyclopentyl, cyclobutyl or cyclopropyl;

for example, 1,2-cyclopentyl, 1,3-cyclopentanyl, 1,2-cyclobutylene, 1,3-cyclobutylene can be listed as the cyclopentanyl, cyclobutylene mentioned above.

R$_{10}$ represents alkyl group having a carbon atom number of 1-10, fluoro-substituted alkyl group having a carbon atom number of 1-10, alkoxy group having a carbon atom number of 1-10, fluoro-substituted alkoxy group having a carbon atom number of 1-10.

By containing the compound represented by formula VI in the liquid crystal composition of the present disclosure, the liquid crystal composition can have large negative dielectric anisotropy, which is conducive to reducing the driving voltage of the device.

The liquid crystal composition of the present disclosure, preferably, the compounds represented by the formula VI are selected from the group consisting of the compounds represented by the following formulas VI-1~VI-6:

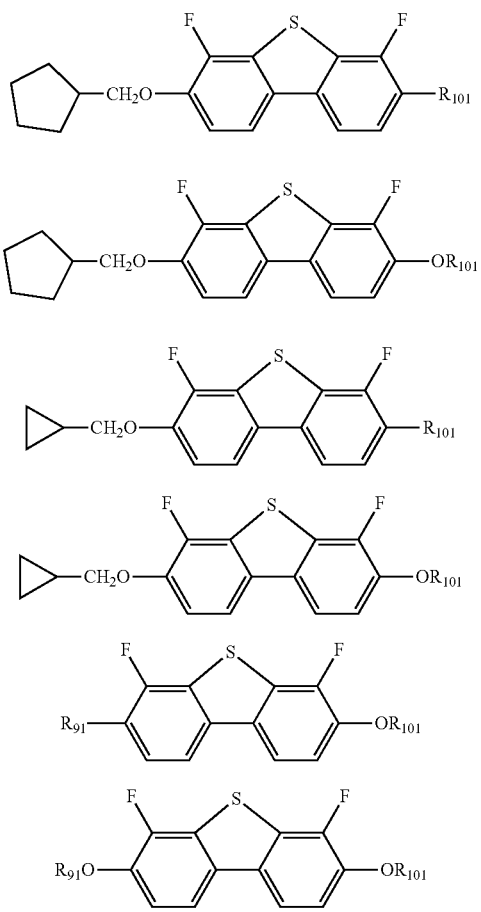

wherein, R$_{91}$ and R$_{101}$ independently represent alkyl group having a carbon atom number of 1-10.

In the liquid crystal composition of the present disclosure, the addition amount (mass ratio) of the compound represented by formula I in the liquid crystal composition is 1-15%, preferably 3-11%; the addition amount (mass ratio) of the compound represented by formula II in the liquid crystal composition is 1-30%, preferably 10-20%; the addition amount (mass ratio) of the compound represented by formula III in the liquid crystal composition is 0-35%, preferably 25-30%; and the addition amount (mass ratio) of the compound represented by formula IV in the liquid crystal composition is 0-60%, preferably 30-45%; the addition amount (mass ratio) of the compound represented by formula V in the liquid crystal composition is 0-20%, preferably 5-20%; the addition amount (mass ratio) of the compound represented by formula VI in the liquid crystal composition is 0-20%, preferably 3-15%.

In the liquid crystal composition of the present disclosure, dopants with various functions can be added. In the case of dopants, the content of dopants preferably accounts for 0.01-1.5% of the liquid crystal composition by mass. These dopants can be listed as antioxidants, ultraviolet absorbers and chiral agents.

Antioxidants can be listed as,

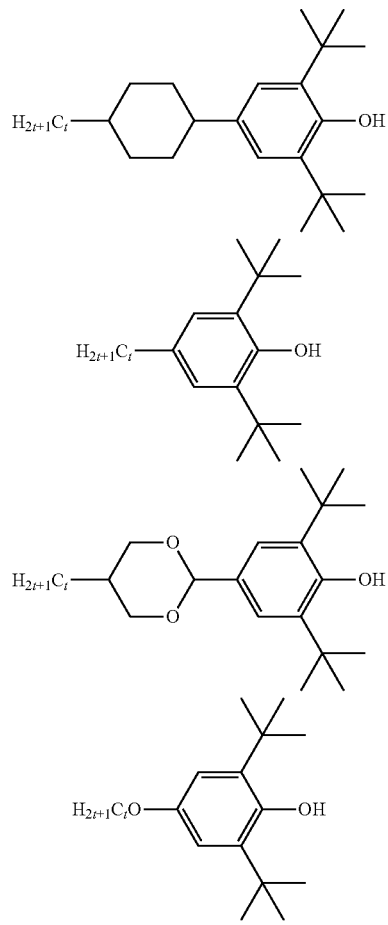

t represents an integer of 1-10;
Chiral agents can be listed as,

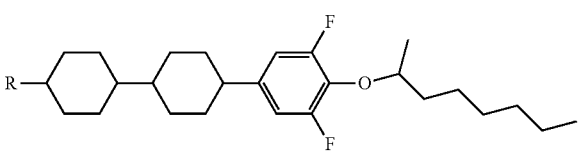

R represents alkyl group having a carbon atom number of 1-10;

Light stabilizers can be listed as,

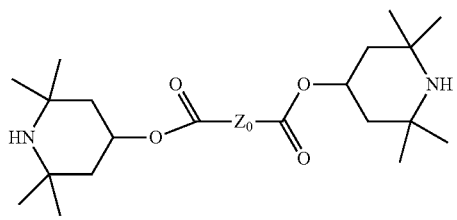

$Z_0$ represents alkylene group having a carbon atom number of 1-20, in which any one or more hydrogen is selectively substituted by halogen, and any one or more —$CH_2$— is selectively substituted by —O—;

Ultraviolet absorbers can be listed as,

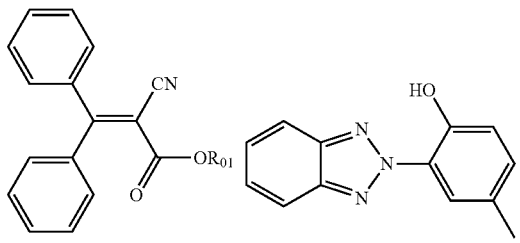

$R_{01}$ represents alkyl group having a carbon atom number of 1-10.

[Liquid Crystal Display Element or Liquid Crystal Display]

The present disclosure also relates to a liquid crystal display element or a liquid crystal display comprising any one of the above liquid crystal compositions; the display element or display is an active matrix display element or display or a passive matrix display element or display.

Alternatively, the liquid crystal display element or liquid crystal display preferably has an active matrix liquid crystal display element or a liquid crystal display.

Alternatively, the active matrix display element or display is IPS-TFT, FFS-TFT, VA-TFT liquid crystal display element or display.

The liquid crystal display element or liquid crystal display comprising the compound or liquid crystal composition has low driving voltage, high voltage retention rate and fast response speed.

EMBODIMENTS

In order to explain the present disclosure more clearly, the present disclosure will be further explained in combination with the preferred embodiment. Those skilled in the art should understand that the contents described below are illustrative rather than restrictive, and the scope of protection of the present disclosure should not be limited.

In this manual, unless otherwise specified, the percentage refers to the mass percentage, and the temperature is degree centigrade (° C.). The specific meaning and test conditions of other symbols are as follows:

Cp is the clear point (° C.) of liquid crystal, and it is measured by DSC quantitative method;

Δn is the optical anisotropy, no is the refractive index of ordinary light, Ne is the refractive index of extraordinary light, the test conditions are 25±2° C., 589 nm, Abbe refractometer test;

Δε is the dielectric anisotropy, $\Delta\varepsilon = \varepsilon_{//} - \varepsilon_\perp$, where $\varepsilon_{//}$ is the dielectric constant parallel to the molecular axis, and $\varepsilon_\perp$ is the dielectric constant perpendicular to the molecular axis. The test conditions are 25±0.5° C., 20 um vertical box, INSTEC:ALCT-IR1 testing;

$\gamma_1$ is the rotational viscosity (mPa·s), and the test conditions are 25±0.5° C. and 20 um vertical box, INSTEC:ALCT-IR1 testing;

$K_{11}$ is the torsional elastic constant and $K_{33}$ is the unfolding elastic constant INSTEC:ALCT-IR1, 20 um vertical box;

VHR is voltage retention rate (%), the test conditions are 20±2° C., voltage is ±5V, pulse width is 10 ms, voltage holding time is 16.7 ms. The test equipment is TOYO Model6254 liquid crystal performance comprehensive tester;

The prepacomparative examplen method of the liquid crystal composition is as follows: each liquid crystal monomer is weighed according to a certain Comparative Example and put into a stainless steel beaker; the stainless steel beaker containing each liquid crystal monomer is heated and melted on the magnetic stirring instrument; after most of the liquid crystal monomer in the stainless steel beaker is melted, a magnetic rotor is added into the stainless steel beaker, and the mixture is stirred evenly and cooled to room temperature to obtain liquid crystal composition.

The structure of liquid crystal monomer in the embodiment of the disclosure is represented by codes. The codes for ring structures, end groups and linking groups of liquid crystals are represented as in Tables 1 and 2 below.

TABLE 1 corresponding codes of ring structure

| Ring structure | Corresponding code |
|---|---|
| (cyclohexane) | C |
| (phenyl) | P |
| (cyclohexene) | L |
| (F-phenyl) | G |
| (F-phenyl) | Gi |
| (F,F-phenyl) | Y |

TABLE 1-continued corresponding codes of ring structure

| Ring structure | Corresponding code |
|---|---|
| (structure with F, O, F) | Sb |
| (structure with F, S, F) | Sc |

TABLE 2 corresponding codes of end group and linking group

| End group and linking group | Corresponding code |
|---|---|
| $C_nH_{2n+1}-$ | n- |
| $C_nH_{2n+1}O-$ | nO— |
| —$CF_3$ | -T |
| —$OCF_3$ | —OT |
| —$CH_2O$— | —O— |
| —F | —F |
| —$CH_2CH_2$— | -E- |
| —CH=CH— | —V— |
| —CH=CH—$C_nH_{2n+1}$ | Vn- |
| (cyclopentyl) | Cp- |
| (cyclopropyl) | Cpr- |
| (cyclopropylmethyl) | Cpr1- |
| (cyclopentylmethoxy) | CpO |
| (cyclopropylmethoxy) | CprO |

EXAMPLES

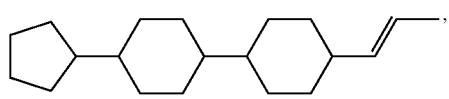 [SMILES: C/C=C/C1CCC(C2CCC(C3CCCC3)CC2)CC1]

the code is CC-Cp-V1;

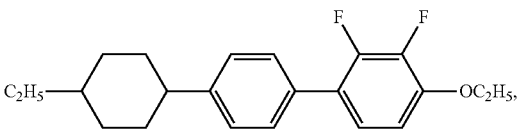 [SMILES: CCOc1ccc(-c2ccc(C3CCC(CC)CC3)cc2)c(F)c1F]

the code is CPY-2-O2;

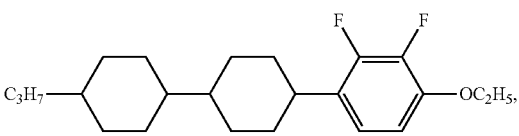

the code is CCY-3-O2;

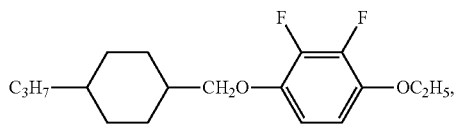

the code is COY-3-O2;

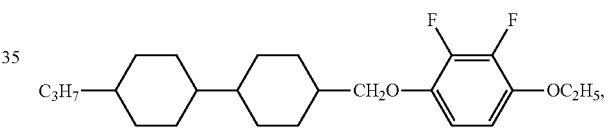

the code is CCOY-3-O2;

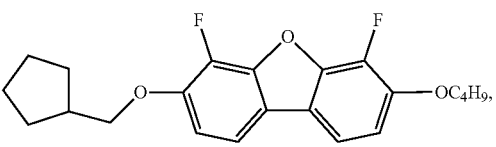

the code is Sb-CpO-O4;

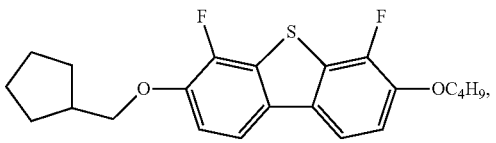

the code is Sc-CpO-O4.

Example 1

The formula and corresponding properties of the liquid crystal composition are shown in Table 3.

TABLE 3

Formula and corresponding properties of liquid crystal composition in example 1

| Category | Liquid crystal monomer code | Content (mass fraction) |
|---|---|---|
| I | CPP-3-1 | 15 |
| II | Sb-CpO-O4 | 7 |
| II | Sb-CpO-O5 | 7.5 |
| II | Sb-4O-O4 | 8 |
| II | Sb-2O-O5 | 6 |
| IV | CC-3-V | 35 |
| IV | CC-2-3 | 12 |
| IV | CC-5-3 | 9.5 |

$\Delta\varepsilon$[1 KHz, 25° C.]: −3.2
$\Delta n$[589 nm, 25° C.]: 0.095
Cp: 56° C.
$\gamma_1$: 61 mPa · s
$K_{11}$: 10.7
$K_{33}$: 10.0

Example 2

The formula and corresponding properties of the liquid crystal composition are shown in Table 4.

TABLE 4

Formula and corresponding properties of liquid crystal composition in example 2

| Category | Liquid crystal monomer code | Content (mass fraction) |
|---|---|---|
| I | CPP-3-1 | 13.5 |
| II | Sb-CpO-O4 | 8.5 |
| II | Sb-4O-O4 | 7.5 |
| II | Sb-2O-O5 | 7 |
| III | CPY-3-O2 | 10.5 |
| IV | CC-3-V | 29.5 |
| IV | CC-2-3 | 15 |
| V | CPP-3-2V1 | 8.5 |

$\Delta\varepsilon$[1 KHz, 25° C.]: −3.1
$\Delta n$[589 nm, 25° C.]: 0.115
Cp: 77° C.
$\gamma_1$: 85 mPa · s
$K_{11}$: 13.5
$K_{33}$: 13.5

Example 3

The formula and corresponding properties of the liquid crystal composition are shown in Table 5.

TABLE 5

Formula and corresponding properties of liquid crystal composition in example 3

| Category | Liquid crystal monomer code | Content (mass fraction) |
|---|---|---|
| I | CPP-3-1 | 9.5 |
| II | Sb-4O-O4 | 8 |
| II | Sb-2O-O5 | 7 |
| III | CY-3-O2 | 8.5 |
| III | CCY-3-O2 | 10.5 |
| IV | CC-2-3 | 21 |
| IV | CC-5-3 | 8 |
| IV | CC-4-3 | 5 |
| IV | PP-5-1 | 7 |
| V | CCP-V-1 | 7 |
| V | CPP-1V-2 | 5 |

TABLE 5-continued

Formula and corresponding properties of liquid crystal composition in example 3

| Category | Liquid crystal monomer code | Content (mass fraction) |
|---|---|---|
| VI | Sc-2O-O4 | 3.5 |

$\Delta\varepsilon$[1 KHz, 25° C.]: −3.2
$\Delta n$[589 nm, 25° C.]: 0.108
Cp: 72° C.
$\gamma_1$: 74 mPa · s
$K_{11}$: 13.3
$K_{33}$: 11.6

Example 4

The formula and corresponding properties of the liquid crystal composition are shown in Table 6.

TABLE 6

Formula and corresponding properties of liquid crystal composition in example 4

| Category | Liquid crystal monomer code | Content (mass fraction) |
|---|---|---|
| I | CPP-3-1 | 7.5 |
| II | Sb-CpO-O4 | 7.5 |
| II | Sb-CpO-O5 | 5 |
| III | CPY-3-O2 | 8.5 |
| III | CY-3-O4 | 7.5 |
| III | CY-3-O2 | 9.5 |
| IV | CC-3-V | 15 |
| IV | CC-2-3 | 19.5 |
| V | CPP-1V-2 | 8 |
| V | CPP-3-2v1 | 7 |
| VI | Sc-CpO-O4 | 5 |

$\Delta\varepsilon$[1 KHz, 25° C.]: −3.3
$\Delta n$[589 nm, 25° C.]: 0.110
Cp: 68° C.
$\gamma_1$: 67 mPa · s
$K_{11}$: 11.7
$K_{33}$: 10.5

Comparative Example 1

The formula and corresponding properties of the liquid crystal composition are shown in Table 7.

TABLE 7

Formula and corresponding properties of liquid crystal composition in Comparative Example 1

| Category | Liquid crystal monomer code | Content (mass fraction) |
|---|---|---|
| I | CPP-3-1 | 7.5 |
|  | PY-2O-O2 | 7.5 |
|  | PY-3-O2 | 5 |
| III | CPY-3-O2 | 8.5 |
| III | CY-3-O4 | 7.5 |
| III | CY-3-O2 | 9.5 |
| IV | CC-3-V | 15 |
| IV | CC-2-3 | 19.5 |
| V | CPP-1V-2 | 8 |
| V | CPP-3-2v1 | 7 |
| VI | Sc-CpO-O4 | 5 |

$\Delta\varepsilon$[1 KHz, 25° C.]: −2.7
$\Delta n$[589 nm, 25° C.]: 0.110
Cp: 68° C.
$\gamma_1$: 68 mPa · s TABLE 7-continued Formula and corresponding properties of liquid crystal composition in Comparative Example 1

| Category | Liquid crystal monomer code | Content (mass fraction) |
|---|---|---|
| | $K_{11}$: 11.7 | |
| | $K_{33}$: 10.5 | |

Sb-CpO-O4 and Sb-CpO-O5 in example 4 are replaced with PY-2O-O2 and PY-3-O2, and the rest are the same as those in example 4, as the comparative example 1. Compared with the comparative example 1, example 4 has larger dielectric anisotropy ($\Delta\varepsilon$), smaller $\gamma_1/K_{33}$ and faster response.

Example 5

The formula and corresponding properties of the liquid crystal composition are shown in Table 8.

TABLE 8

Formula and corresponding properties of liquid crystal composition in example 5

| Category | Liquid crystal monomer code | Content (mass fraction) |
|---|---|---|
| I | CPP-3-1 | 5 |
| II | Sb-CpO-O4 | 5.5 |
| II | Sb-CpO-O2 | 5 |
| III | CY-3-O2 | 8.5 |
| III | PY-3-O2 | 7 |
| III | PY-2O-O2 | 5 |
| III | PY-2O-O4 | 8 |
| IV | CC-3-V | 19.5 |
| IV | CC-2-3 | 8 |
| V | CPP-1V-2 | 7 |
| V | CPP-3-2V1 | 5 |
| V | CPP-3-2 | 3 |
| VI | Sc-CpO-O4 | 6.5 |
| VI | Sc-CpO-O2 | 7 |
| | $\Delta\varepsilon$[1 KHz, 25° C.]: −4.1 | |
| | $\Delta n$[589 nm, 25° C.]: 0.129 | |
| | Cp: 61° C. | |
| | $\gamma_1$: 71 mPa · s | |
| | $K_{11}$: 11.0 | |
| | $K_{33}$: 10.4 | |

Example 6

The formula and corresponding properties of the liquid crystal composition are shown in Table 9 below.

TABLE 9

Formula and corresponding properties of liquid crystal composition in example 6

| Category | Liquid crystal monomer code | Content (mass fraction) |
|---|---|---|
| I | CPP-3-1 | 11.5 |
| II | Sb-4O-O4 | 3 |
| II | Sb-2O-O4 | 4 |
| III | CPY-3-O2 | 7.5 |
| III | CCOY-3-O2 | 10.5 |
| III | COY-3-O2 | 13 |
| IV | CC-3-V | 29.5 |
| IV | CC-5-3 | 5 |
| V | CPP-3-2 | 8 |

TABLE 9-continued

Formula and corresponding properties of liquid crystal composition in example 6

| Category | Liquid crystal monomer code | Content (mass fraction) |
|---|---|---|
| V | CPP-5-2 | 5 |
| VI | Sc-2O-O4 | 3 |
| | $\Delta\varepsilon$[1 KHz, 25° C.]: −3.5 | |
| | $\Delta n$[589 nm, 25° C.]: 0.110 | |
| | Cp: 88° C. | |
| | $\gamma_1$: 95 mPa · s | |
| | $K_{11}$: 14.4 | |
| | $K_{33}$: 16.2 | |

Example 7

The formula and corresponding properties of the liquid crystal composition are shown in table 10 below.

TABLE 10

Formula and corresponding properties of liquid crystal composition in Example 7

| Category | Liquid crystal monomer code | Content (mass fraction) |
|---|---|---|
| I | CPP-3-1 | 9.5 |
| II | Sb-CpO-O4 | 5 |
| III | CPY-3-O2 | 10.5 |
| III | CCY-3-O2 | 7.5 |
| III | COY-3-O2 | 7.5 |
| III | CCOY-4-O2 | 7 |
| IV | CC-3-V | 25 |
| IV | CC-2-3 | 10.5 |
| IV | CC-5-3 | 7 |
| VI | Sc-CpO-O4 | 5.5 |
| VI | Sc-CpO-O2 | 5 |
| | $\Delta\varepsilon$[1 KHz, 25° C.]: −3.9 | |
| | $\Delta n$[589 nm, 25° C.]: 0.102 | |
| | Cp: 82° C. | |
| | $\gamma_1$: 92 mPa · s | |
| | $K_{11}$: 13.7 | |
| | $K_{33}$: 15.2 | |

Example 8

The formula and corresponding properties of the liquid crystal composition are shown in Table 11 below.

TABLE 11

Formula and corresponding properties of liquid crystal composition in example 8

| Category | Liquid crystal monomer code | Content (mass fraction) |
|---|---|---|
| I | CPP-3-1 | 14.5 |
| II | Sb-CpO-O4 | 8 |
| II | Sb-CpO-O5 | 8.5 |
| II | Sb-CpO-O2 | 7 |
| IV | CC-3-V | 25 |
| IV | CC-2-3 | 15 |
| IV | CC-5-3 | 10 |

TABLE 11-continued

Formula and corresponding properties of liquid crystal composition in example 8

| Category | Liquid crystal monomer code | Content (mass fraction) |
|---|---|---|
| VI | Sc-CpO-O4 | 6 |
| VI | Sc-CpO-O2 | 6 |
| | Δε[1 KHz, 25° C.]: −3.8 | |
| | Δn[589 nm, 25° C.]: 0.105 | |
| | Cp: 60° C. | |
| | $\gamma_1$: 75 mPa · s | |
| | $K_{11}$: 11.4 | |
| | $K_{33}$: 10.7 | |

TABLE 12

Reliability data of example and comparative example

| Experiment number | VHR (initial)/% | VHR (UV) /% | VHR (Heat) /% |
|---|---|---|---|
| Example 4 | 96.55 | 95.49 | 96.00 |
| Comparative Example 1 | 93.49 | 90.40 | 89.45 |

The reliability of liquid crystal composition is tested by UV, high temperature aging test and VHR test.

The smaller the change of VHR data before and after UV and high temperature test, the stronger the ability of anti ultraviolet and high temperature. Therefore, the ability of anti ultraviolet and high temperature resistance is judged by comparing the difference of VHR data of each example and comparison case before and after the test.

Firstly, the VHR data of liquid crystal composition are measured as the initial VHR data before the ultraviolet and high temperature aging test. Then, the UV and high temperature aging tests are conducted on the liquid crystal composition, and the VHR data of the liquid crystal composition are measured again after the test.

UV aging test: the liquid crystal composition is placed in a 365 nm UV lamp to irradiate 5000 mJ energy.

High temperature aging test: the liquid crystal composition is placed in an oven at 100° C. for one hour.

After aging test, the smaller the change of VHR data relative to the initial VHR data indicates that the stronger the anti ultraviolet and high temperature resistance of the liquid crystal composition is, so it can be judged that the stronger the ability of the liquid crystal composition to resist the external environment damage in the working process, therefore, the more reliable the liquid crystal composition is.

In addition, the liquid crystal composition according to example 4, comparative example 1 is poured into the liquid crystal test box for residual image test. The test results are shown in Table 12 above.

It can be seen from Table 12 that the UV resistance and high temperature resistance of the liquid crystal composition of the invention are very obvious. Therefore, the liquid crystal composition of the invention has good UV resistance and high temperature resistance performance.

Obviously, the above-mentioned examples of the present disclosure are only for the purpose of clearly explaining the examples of the present disclosure, rather than limiting the implementation mode of the present disclosure. For ordinary technical personnel in the art, other changes or changes in different forms can be made on the basis of the above description. Here, it is impossible to enumerate all the examples, and all the technologies belong to the present disclosure The obvious changes or changes in the technical scheme are still within the scope of protection of the present disclosure.

The invention claimed is:

1. A liquid crystal composition, wherein the liquid crystal composition comprises a compound represented by formula I and two compounds represented by formula II, three compounds represented by formula IV-1, and one or more compounds represented by formula VI-6,

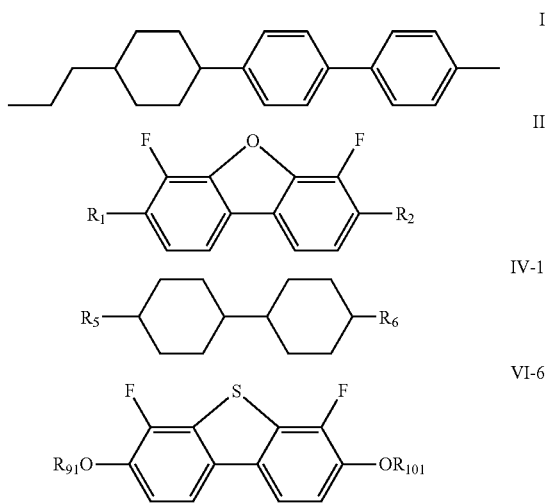

in formula II, $R_1$ represents alkoxy group having a carbon atom number of 2 or 4;
$R_2$ represents alkoxy group having a carbon atom number of 4-5;
$R_5$ and $R_6$ independently represent alkyl group having a carbon atom number of 2-5;
$R_{91}$ and $R_{101}$ independently represent alkyl group having a carbon atom number of 2 or 4;
a mass content of the compound represented by formula I is 9.5%, a mass content of the two compounds represented by formula II is 15%, a mass content of the three compounds represented by formula IV-1 is 34%, and a mass content of the one or more compounds represented by formula VI-6 is 3.5%.

2. The liquid crystal composition according to claim 1, wherein the liquid crystal composition further comprises one or more compounds represented by formula III,

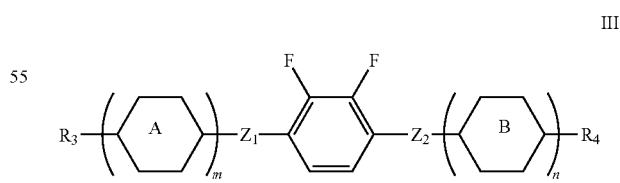

in formula III, $R_3$ and $R_4$ independently represent alkyl group having a carbon atom number of 1-10, fluoro-substituted alkyl group having a carbon atom number of 1-10, alkoxy group having a carbon atom number of 1-10, fluoro-substituted alkoxy group having a carbon atom number of 1-10, alkenyl group having a carbon atom number of 2-10, fluoro-substituted alkenyl group having a carbon atom number of 2-10, alkenoxy group having a carbon atom number of 3-8 or fluoro-substituted alkenoxy group having a carbon atom number of 3-8;

any one —CH$_2$— or several —CH$_2$— that are not adjacent of the groups indicated by R$_3$ and R$_4$ are selectively substituted by cyclopentyl, cyclobutyl or cyclopropyl;

Z$_1$ and Z$_2$ independently represent single bond, —CH$_2$CH$_2$—, —OCH$_2$— or —CH$_2$O—;

independently represent 1,4-cyclohexylidene, 1,4-cyclohexene, 1,4-phenylene or fluoro 1,4-phenylene;

m represents 0 or 1; n represents 0, 1 or 2.

3. The liquid crystal composition according to claim 2, wherein the compound represented by formula III is selected from the group consisting of compounds represented by formula III-1 to III-11:

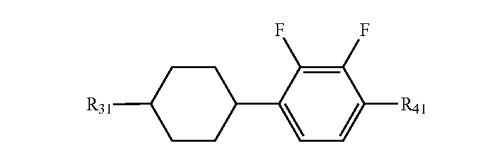

III-1

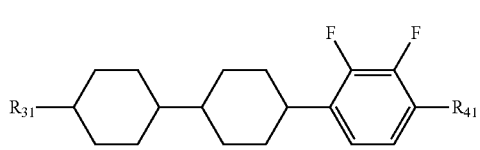

III-2

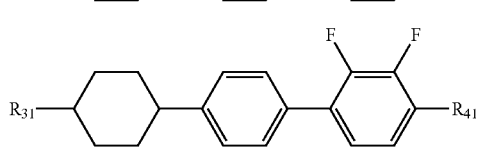

III-3

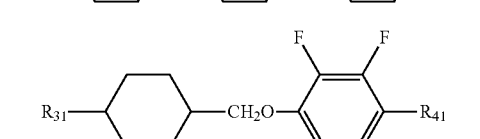

III-4

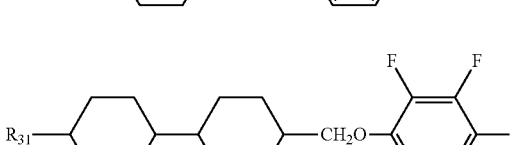

III-5

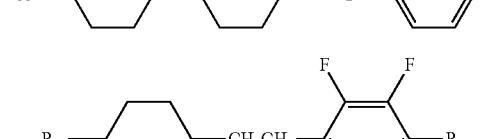

III-6

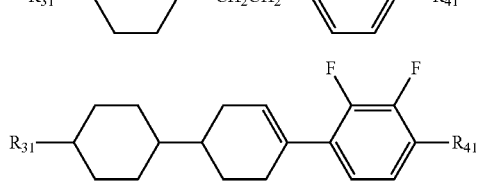

III-7

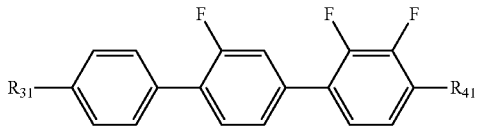

III-8

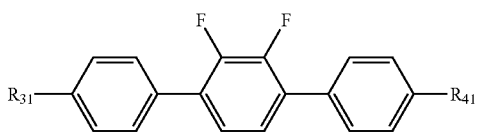

III-9

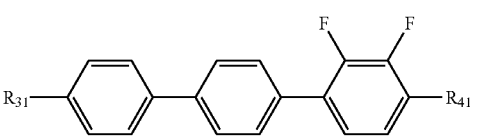

III-10

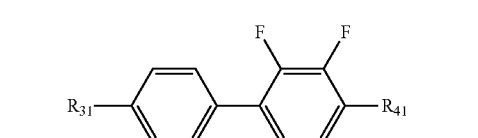

III-11 wherein:
R$_{31}$ and R$_{41}$ independently represent alkyl group having a carbon atom number of 1-10, fluoro-substituted alkyl group having a carbon atom number of 1-10, alkoxy group having a carbon atom number of 1-10, fluoro-substituted alkoxy group having a carbon atom number of 1-10, alkenyl group having a carbon atom number of 2-10, fluoro-substituted alkenyl group having a carbon atom number of 2-10, alkenoxy group having a carbon atom number of 3-8 or fluoro-substituted alkenoxy group having a carbon atom number of 3-8;

any one —CH$_2$— or several —CH$_2$— that are not adjacent of the groups indicated by R$_{31}$ and R$_{41}$ are selectively substituted by cyclopentyl, cyclobutyl or cyclopropyl.

4. The liquid crystal composition according to claim 1, wherein the liquid crystal composition further comprises one or more compounds represented by formula V except for those represented by formula I:

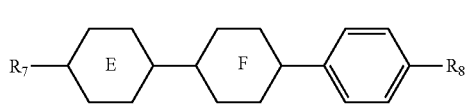

V in formula V, R$_7$ and R$_8$ independently represent alkyl group having a carbon atom number of 1-10, fluoro-substituted alkyl group having a carbon atom number of 1-10, alkoxy group having a carbon atom number of 1-10, fluoro-substituted alkoxy group having a carbon atom number of 1-10, alkenyl group having a carbon atom number of 2-10, fluoro-substituted alkenyl group having a carbon atom number of 2-10;

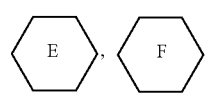

independently represent 1,4-cyclohexylidene, 1,4-cyclohexene or 1,4-phenylene.

5. The liquid crystal composition according to claim 4, wherein the compounds represented by formula V except for those represented by formula I are selected from the group consisting of compounds represented by formulas V-1 to V-3:

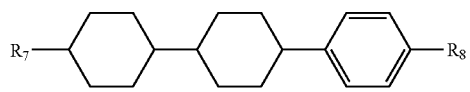

V-1

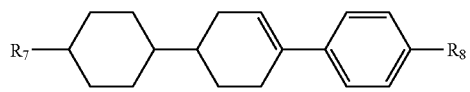

V-2

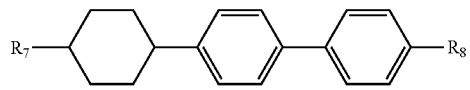

V-3 wherein,
$R_7$ and $R_8$ independently represent alkyl group having a carbon atom number of 1-10, fluoro-substituted alkyl group having a carbon atom number of 1-10, alkoxy group having a carbon atom number of 1-10, fluoro-substituted alkoxy group having a carbon atom number of 1-10, alkenyl group having a carbon atom number of 2-10, fluoro-substituted alkenyl group having a carbon atom number of 2-10.

6. A liquid crystal display element or liquid crystal display, wherein the liquid crystal display element or liquid crystal display comprises the liquid crystal composition of claim 1, the liquid crystal display element or liquid crystal display is an active matrix display element or display or a passive matrix display element or display.

* * * * *